US012670827B2

(12) United States Patent
Katsuta

(10) Patent No.: US 12,670,827 B2
(45) Date of Patent: Jun. 30, 2026

(54) PROTECTION CIRCUIT AND DISPLAY DEVICE INCLUDING THE PROTECTION CIRCUIT

(71) Applicant: Japan Display Inc., Tokyo (JP)

(72) Inventor: Tadayoshi Katsuta, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/199,339

(22) Filed: May 5, 2025

(65) Prior Publication Data

US 2026/0004693 A1 Jan. 1, 2026

(30) Foreign Application Priority Data

Jun. 27, 2024 (JP) ................................ 2024-103652

(51) Int. Cl.
*G09G 3/20* (2006.01)

(52) U.S. Cl.
CPC ........... *G09G 3/20* (2013.01); *G09G 2330/04* (2013.01)

(58) Field of Classification Search
None
See application file for complete search history.

(56) References Cited

U.S. PATENT DOCUMENTS

2008/0174577 A1* 7/2008 Fujita .................. G09G 3/3677 345/204
2010/0264822 A1* 10/2010 Aoki ...................... G09G 3/325 315/51
2017/0357353 A1* 12/2017 Katsuta ............... G06F 3/04164
2024/0162242 A1* 5/2024 Park ..................... G09G 3/3233

FOREIGN PATENT DOCUMENTS

JP 2010-049149 A 3/2010
JP 2020-154250 A 9/2020

* cited by examiner

*Primary Examiner* — Krishna P Neupane
(74) *Attorney, Agent, or Firm* — XSENSUS LLP

(57) ABSTRACT

A display device includes a plurality of pixels, a driver circuit for controlling the plurality of pixels, a plurality of first protection circuits connected in parallel to each other, a first terminal electrically connected to the driver circuit through the plurality of first pixel circuits, first and second power-source lines respectively supplied with a high potential and a low potential, and a first control-signal wiring. Each of the first protection circuits has a resistor element, a first diode, and a second diode. Connection relationships in the first protection circuit will be explained in the specification.

13 Claims, 16 Drawing Sheets

PROTECTION CIRCUIT AND DISPLAY DEVICE INCLUDING THE PROTECTION CIRCUIT

CROSS-REFERENCE TO RELATED APPLICATION

This application claims the benefit of priority to Japanese Patent Application No. 2024-103652, filed on Jun. 27, 2024, the entire contents of which are incorporated herein by reference.

FIELD

An embodiment of the present invention relates to a protection circuit and a display device including the protection circuit.

BACKGROUND

In display devices such as liquid crystal display devices, a plurality of pixels for reproducing images as well as driver circuits for driving the pixels are provided over a substrate. The plurality of pixels and the driver circuits are composed of a large number of semiconductor elements exemplified by thin-film transistors and the like, and these elements are formed using photolithography which requires a great number of processes. Therefore, protection circuits may be provided to prevent pixels and driver circuits from being destroyed not only by surge currents but also by electrostatic breakdown caused by static electricity generated during manufacturing. For example, Japanese Laid-open Patent Applications No. 2010-049149 and 2020-154250 disclose display devices in which protection circuits are provided to protect the driver circuits.

SUMMARY

An embodiment of the present invention is a display device. The display device includes a plurality of pixels, a driver circuit, a plurality of first protection circuits, a first terminal, a first power-source line, a second power-source line, and a first control-signal wiring. The driver circuit is configured to control the plurality of pixels. The plurality of first protection circuits is connected in parallel to each other. The first terminal is electrically connected to the driver circuit through the plurality of first protection circuits. The first power-source line and the second power-source line are respectively configured to be supplied with a first potential and a second potential lower than the first potential. The first control-signal wiring electrically connects the plurality of first protection circuits to the driver circuit. Each of the plurality of first protection circuits includes a first resistor element, a first diode, and a second diode. A first end and a second end of the resistor element are electrically connected to the first terminal and the first control-signal wiring, respectively. An input terminal and an output terminal of the first diode are electrically connected to the second end of the resistor element and the first power-source line, respectively. An input terminal and an output terminal of the second diode are electrically connected to the second power-source line and the second end of the resistor element, respectively.

An embodiment of the present invention is a protection circuit. The protection circuit includes a first resistor element and a second resistor element as well as a first diode, a second diode, a third diode, and a fourth diode. A first end of the first resistor element and a first end of the second resistor element are electrically connected to each other. A second end of the first resistor element and a second end of the second resistor element are electrically connected to each other. The second end of the first resistor element is electrically connected to an input terminal of the first diode and an output terminal of the second diode. The second end of the second resistor element is electrically connected to an input terminal of the third diode and an output terminal of the fourth diode. Output terminals of the first diode and the third diode are electrically connected to each other. Input terminals of the second diode and the fourth diode are electrically connected to each other.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the present invention, when one film is processed to form a plurality of films, these films may have different functions and roles. However, these films originate from the film prepared as the same layer by the same process and have substantially the same layer structure, material, and morphology. Hence, the plurality of films is defined as existing in the same layer.

1. OVERALL STRUCTURE OF DISPLAY DEVICE

Figure 1:
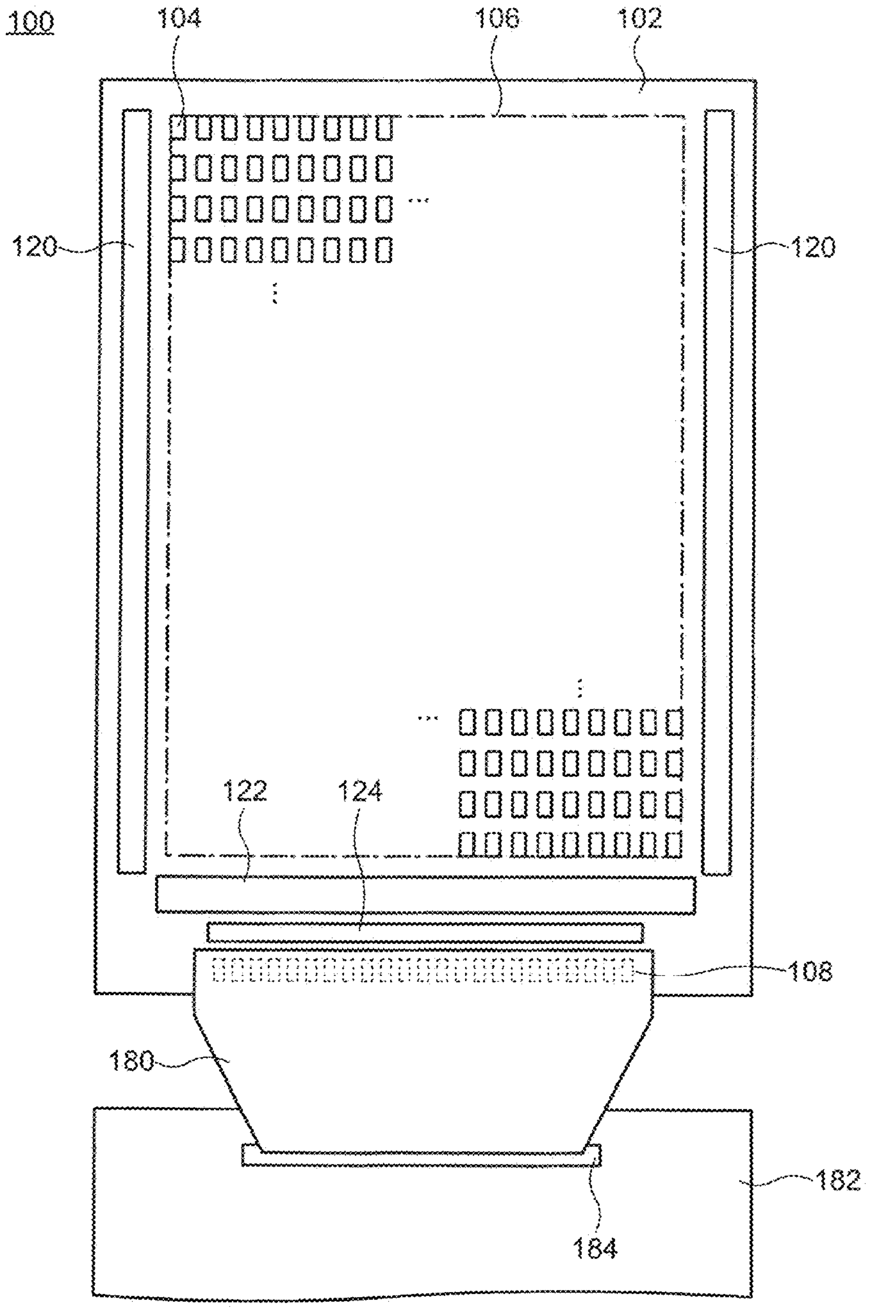
FIG. 1 is a schematic top view of a display device according to an embodiment of the present invention.

FIG. 1 shows a schematic top view of a display device 100 according to an embodiment of the invention. The display device 100 has a substrate 102 and a counter substrate (not illustrated) facing the substrate 102. Various conductive films, semiconductor films, insulating films, and the like formed using photolithography processes are arranged between the substrate 102 and the counter substrate. Appropriate combination of these conductive films, semiconductor films, insulating films, and the like results in the formation of a plurality of pixels 104 each including a display element as well as driver circuits for driving the pixels (gate-line driver circuit 120, signal-line driver circuit 122), a protection-circuit unit 124 composed of a plurality of protection circuits to be described later, a plurality of terminals 108 electrically connected to the driver circuits, and the like. A region where the plurality of pixels 104 is formed (the region surrounded by the chain line in FIG. 1) is a display region 106, while a region surrounding the display region 106 and provided with the driver circuits, the protection-circuit unit 124, and the terminals 108 is a frame region. Although not illustrated in FIG. 1, a plurality of gate lines extending from the gate-line driver circuit 120 to the pixels 104, a plurality of image-signal lines extending from the signal-line driver circuit 122 to the pixels 104, control-signal lines connecting the protection-circuit unit 124 and the signal-line driver circuit 122, power-source lines to supply a constant potential, and the like are formed with one or a plurality of patterned conductive films over the substrate 102.

As shown in FIG. 1, the plurality of pixels 104 is arranged in a matrix form having a plurality of rows and a plurality of columns. The signal-line driver circuit 122 is arranged so that its longitudinal direction is parallel to the row direction or the column direction (row direction in the example shown in FIG. 1), while the gate-line driver circuit 120 is arranged so that its longitudinal direction is parallel to the column direction or the row direction (column direction in the example shown in FIG. 1). Each pixel 104 is provided with a display element, whereby each pixel functions as the smallest unit providing color information. The display element may be a liquid crystal element or an electroluminescence element.

Figure 2:
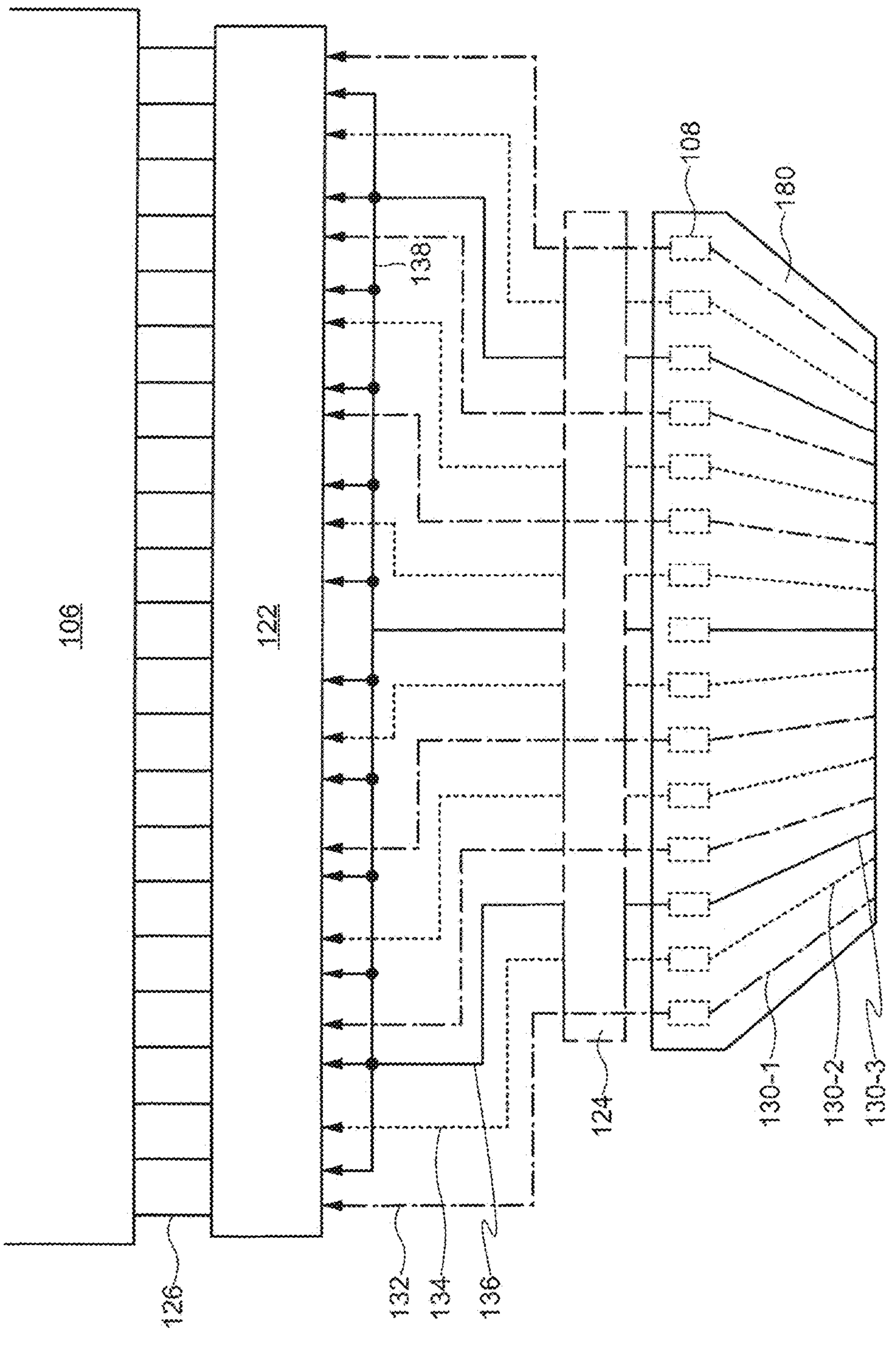
FIG. 2 is a schematic top view of a display device according to an embodiment of the present invention.

The plurality of terminals 108 is provided to be arranged in the row direction or the column direction. The plurality of terminals 108 is electrically connected to a flexible printed circuit board (hereinafter, referred to as FPC) 180, and the FPC 180 is connected to an external circuit 182 via a connector 184. A high voltage potential ($V_{DD}$) and a low voltage potential ($V_{SS}$) lower than $V_{DD}$ are supplied from the external circuit through the FPC 180 and the terminals 180 to drive the display device 100. The voltage potentials $V_{DD}$ and $V_{SS}$ are supplied to the plurality of pixels 104 and the driver circuits. More specifically, each of the voltage potentials $V_{DD}$ and $V_{SS}$ is supplied to one or more terminals 108 selected from the plurality of terminals 108 through the plurality of wirings 130-1 provided to the FPC 180 as shown in FIG. 2. The voltage potentials $V_{DD}$ and $V_{SS}$ are each supplied to the power-source lines 132 extending from the terminals 108 and are supplied to the pixels 104 and the signal-line driver circuits 122 by the power-source lines 132. Although the power-source lines 132 may intersect the protection-circuit unit 124, they need not be connected to the protection circuit structuring the protection-circuit unit 124. Although not illustrated, a portion of the power-source lines 132 is connected to the gate-line driver circuit 120, by which the voltage potentials $V_{DD}$ and $V_{SS}$ are supplied to the gate-line driver circuit 120.

The external circuit 182 further generates high-frequency clock signals as well as a variety of signals such as image signals, initialization signals, and reset signals for controlling the pixels 104, and these signals are input to the signal-line driver circuit 122 through the FPC 180, the terminals 108, and the protection-circuit unit 124. Specifically, the clock signals are input to one or multiple terminals 108 via one or multiple wirings 130-3 provided in the FPC 180 as shown in FIG. 2. The clock signals input from each of the wirings 130-3 are input to one terminal 108 and then input to the protection circuit included in the protection-circuit unit 124, and further to the signal-line driver circuit 122 through one control-signal wiring 136 electrically connecting this protection circuit and the signal-line driver circuit 122. More specifically, the control-signal wiring 136 is branched to the wiring 138, and the clock signals are input, via the wiring 138, to a plurality of buffers, scanners, and the like (not illustrated) structuring the signal-line driver circuit 122.

On the other hand, the signals with a lower frequency compared to the clock signals, such as image signals, initialization signals, and reset signals, are input via one or multiple wirings 130-2 provided in the FPC 180. Each wiring 130-2 is connected to one terminal 108. Each terminal 108 to which the image signals, the initialization signals, the reset signals, or the like are supplied is connected to one signal wiring 134 via the protection circuit included in the protection-circuit unit 124. These signals are input to the signal-line driver circuit 122 via the signal wirings 134, and the signals for controlling the pixels 104 are supplied to each pixel 104 by the signal-line driver circuit 122 via the image-signal lines 126.

2. PROTECTION CIRCUIT

The protection-circuit unit 124 includes the protection circuit in accordance with one of the embodiments of the present invention. As shown in the equivalent circuit of FIG. 3, the protection-circuit unit 124 of the display device 100 according to an embodiment of the present invention is provided with a plurality of protection circuits 140 electrically connected to the control-signal wiring 136 and arranged in parallel with each other. In the equivalent circuit of FIG. 3, one control-signal wiring 136 and one terminal 108 are electrically connected by two protection circuits 140.

Each protection circuit 140 includes a resistor element 142 and two diodes (a first diode 144-1 and a second diode 144-2). A first end of the resistor element 142 of one protection circuit 140 is electrically connected to a first end of the resistor element 142 of the other protection circuit 140, and these first ends are connected to the terminal 108 to which the clock signals are input. Thus, one terminal 108 is shared by multiple protection circuits 140. A second end of the resistor element 142 of one protection circuit 140 and a second end of the resistor element 142 of the other protection circuit 140 are also electrically connected to each other, and these second ends are electrically connected to one control-signal wiring 136. Thus, one control-signal wiring 136 is shared by multiple protection circuits 140.

In each protection circuit 140, the second end of resistor element 142 is connected to an input terminal of the first diode 144-1 and an output terminal of the second diode 144-2. An output terminal of the first diode 144-1 is electrically connected to the high-potential power-source line 132-1 supplied with the voltage potential $V_{DD}$, while an input terminal of the second diode 144-2 is electrically connected to the low-potential power-source line 132-2 supplied with the voltage potential $V_{SS}$. Thus, the input terminals of the first diodes 144-1 of the plurality of protection circuits 140 are electrically connected to each other, and likewise, the input terminals of the second diodes 144-2 of the plurality of protection circuits 140 are electrically connected to each other.

The resistance of the resistor element 142 is the same between the plurality of protection circuits 140 and is, for example, equal to or greater than 0.5 kΩ and equal to or less than 5.0 kΩ. The current input to the signal-line driver circuit 122 can be reduced by providing the resistor elements 142 with such a relatively large resistance, even if a large current caused by a surge current or static electricity is input from the terminal 108. Since the resistance of the control-signal wiring 136 between the connection node $N_1$ to which the plurality of protection circuits 140 and the control-signal wiring 136 are connected and each resistor element 142 is smaller than the resistance of the control-signal wiring 136 from the connection node $N_1$ to the signal-line driver circuit, a part of the current input through the resistor element 142 having the aforementioned resistance can be diverted to the second diode 144-2 of the other protection circuit 140 through connection node $N_1$ even if a difference in resistance of resistor element 142 occurs between the plurality of protection circuits 140 due to unavoidable manufacturing variations in the manufacturing process. Therefore, the display device 100 is able to have high tolerance to electrostatic breakdown caused by static electricity and surge currents.

Note that it is also possible to recognize a plurality of protection circuits 140 connected to one terminal 108 and the corresponding control-signal wiring 136 as a single protection circuit. In this case, each protection circuit is recognized as including a first resistor element (the resistor element 142 of the protection circuit 140 on the left side in FIG. 3) and a second resistor element (the resistor element 142 of the protection circuit 140 on the right side in the same figure) connected in parallel to each other as well as a first diode (the first diode 144-1 of the protection circuit 140 on the left side in the same figure), a second diode (the second diode 144-2 of the protection circuit 140 on the left side in the same figure), a third diode (the first diode 144-1 of the protection circuit 140 on the right side in the same figure), and a fourth diode (the second diode 144-2 of the protection circuit 140 on the right side in the same figure).

Figure 4:
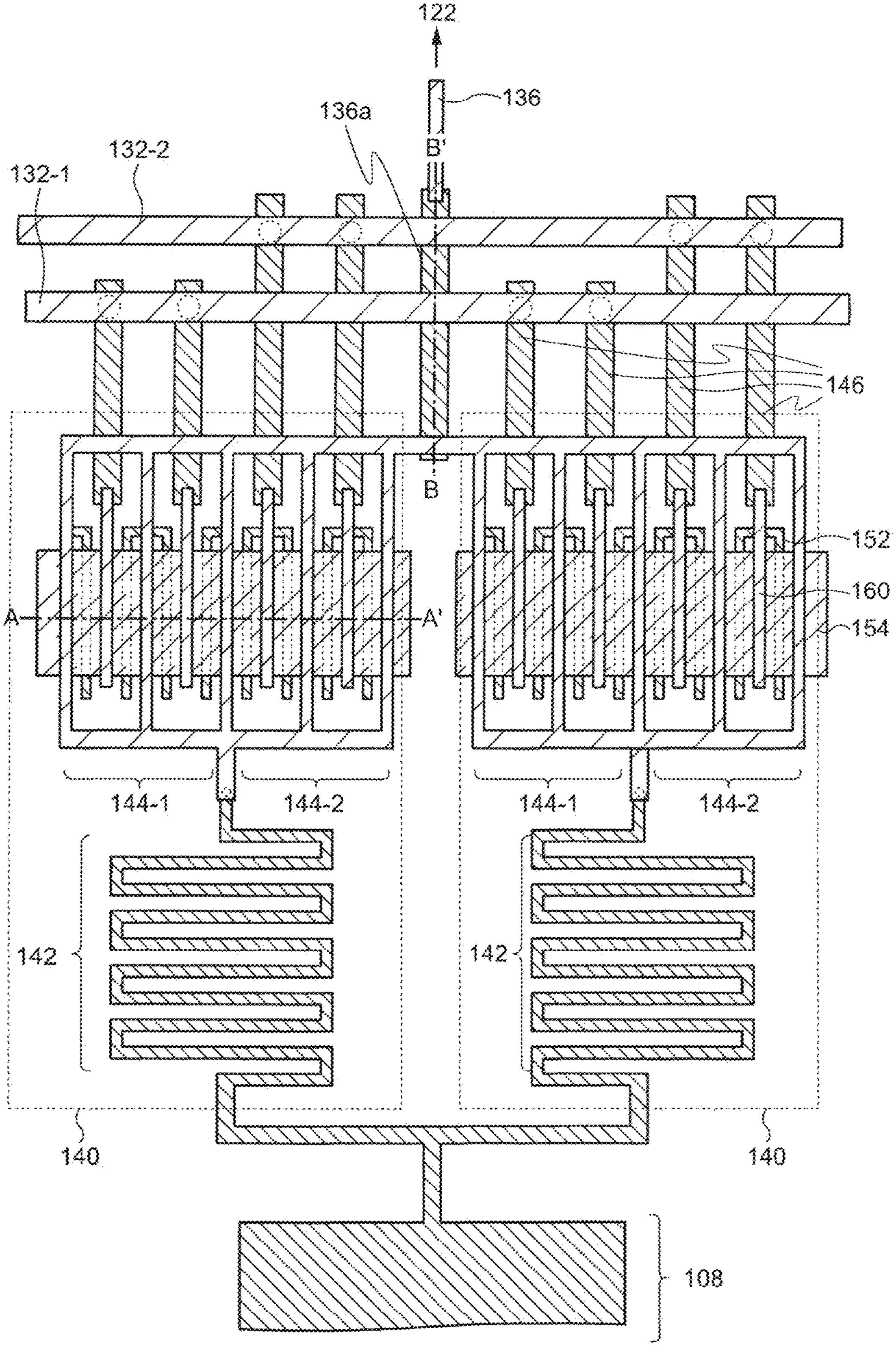
FIG. 4 is a schematic top view of a display device according to an embodiment of the present invention.
Figure 5:
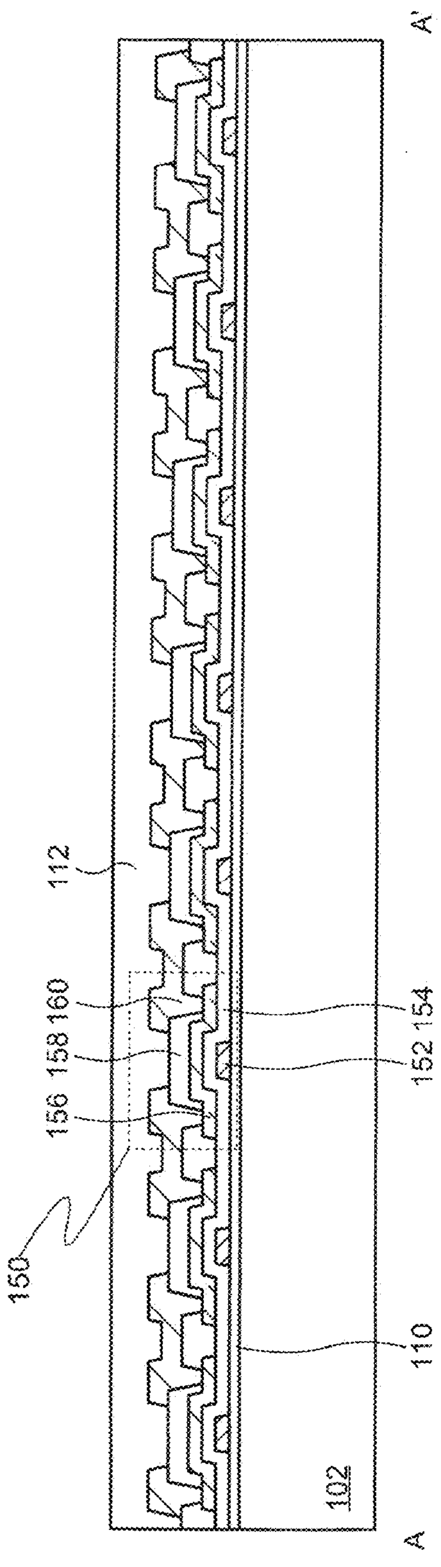
FIG. 5 is a schematic cross-sectional view of a display device according to an embodiment of the present invention.
Figure 6:
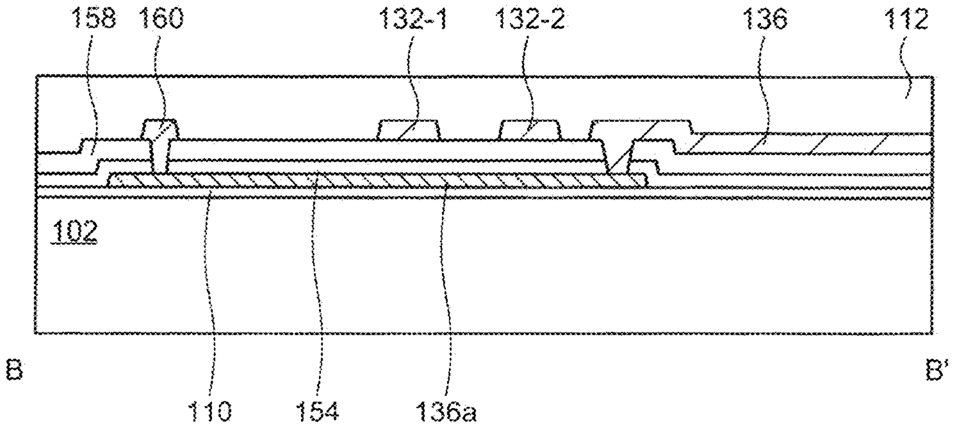
FIG. 6 is a schematic cross-sectional view of a display device according to an embodiment of the present invention.

A schematic top view including the two protection circuits 140 is shown in FIG. 4, and schematic views of the cross-sections along the chain lines A-A' and B-B' of FIG. 4 are respectively shown in FIG. 5 and FIG. 6. As can be understood from FIG. 4 and FIG. 5, each diode 144 of the protection circuit 140 is composed of a plurality of transistors 150 electrically connected to each other. There is no restriction on the structure of the transistors 150, and the transistors 150 may may be bottom-gate transistors or top-gate transistors. Alternatively, the transistors 150 may each have a plurality of gate electrodes vertically sandwiching the semiconductor film. In the example shown in FIG. 5, the transistors 150 are each a bottom-gate transistor and are provided over a substrate 102 either directly or through an undercoat 110 which is an optional component. In this example, the transistors 150 each have a gate electrode 152, a gate insulating film 154 over the gate electrode 152, a semiconductor film 156 located over the gate insulating film 154 and overlapping the gate electrode 152, an interlayer insulating film 158 over the semiconductor film 156, and a pair of source/drain terminals 160 located over the interlayer insulating film 158 and electrically connected to the semiconductor film 156, and the like. The source/drain terminal 160 is shared by adjacent transistors 150, by which the adjacent transistors 150 are electrically connected. As shown in FIG. 4, one of the pair of source/drain terminals 160 of each transistor 150 is electrically connected to the terminal 108 via the resistor element 142, while the other source/drain terminal 160 is electrically connected to the high-potential power-source line 132-1 or the low-potential power-source line 132-2 via a connection wiring 146 existing in the same layer as the gate electrode 152 and to the corresponding gate electrode 152. A leveling film 112 is provided over the transistor 150 (FIG. 5), by which the unevenness caused by the transistors 150 is absorbed and a flat surface is formed.

Since the transistors 150 and the leveling film 112 described above can be formed using known materials and methods, a detailed description is omitted. In brief, the undercoat 110, the gate insulating film 154, the interlayer insulating film 158, and the like may be formed with one or a plurality of films containing a silicon-containing inorganic compound such as silicon nitride and silicon oxide. The leveling film 112 may be configured to include a polymer such as an acrylic resin, an epoxy resin, a silicon resin, and a polyimide resin. The gate electrode 152 and the source/drain terminals 160 as well as the power-source line 132 and the connection wiring 146 may be configured to include a metal such as molybdenum, tantalum, titanium, copper, and aluminum or an alloy including one or a plurality of these metals. Preferably, the metals are selected so that the resistance of the source/drain terminals 160 is lower than that of the gate electrode 152. The control-signal wiring 136 and power-source line 132 are formed to exist in the same layer as the source/drain terminals 160. The gate electrode 152 and the connection wiring 146 are formed to exist in the same layer as each other and in a different layer from the source/drain terminals 160. The semiconductor film 156 may include silicon or an oxide of a Group 13 transition metal such as gallium and indium. The crystallinity of the semiconductor film 156 is not limited and may be monocrystalline, polycrystalline, or amorphous. Although not illustrated, the leveling film 112 extends to the display region 106, and the display element is provided in each pixel 104 using the flat top surface of the leveling film 112.

Figure 3:
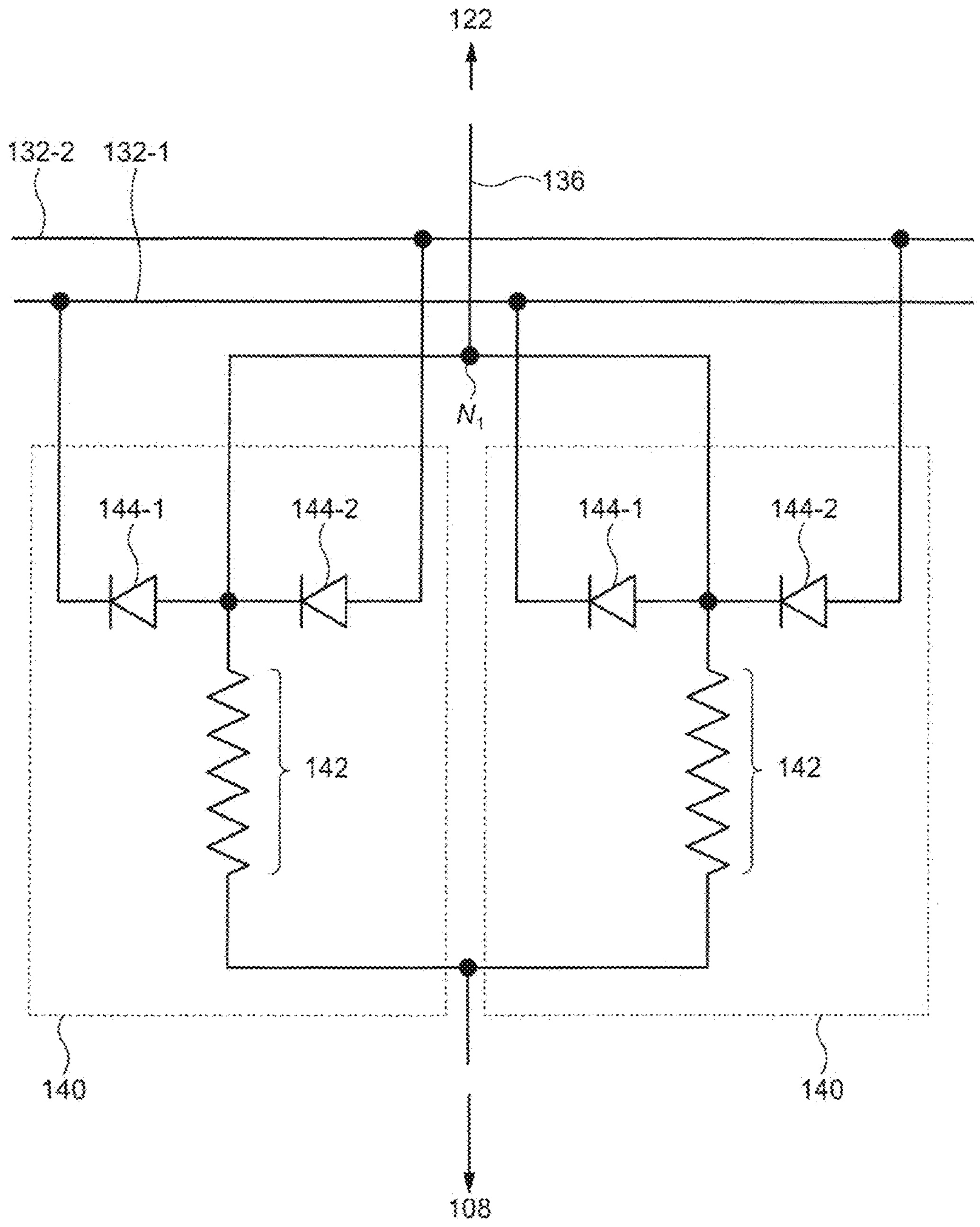
FIG. 3 is an equivalent circuit diagram including a protection circuit according to an embodiment of the present invention.

Here, the connection node $N_1$ is preferably located on a side of the protection circuit 140 with respect to the power-source lines 132 as shown in FIG. 3. In other words, the connection node $N_1$ is preferably located between the plurality of protection circuits 140 and the high-potential power-source line 132-1 and between the plurality of protection circuits 140 and the low-potential power-source line 132-2. In this case, the control-signal wiring 136 does not intersect the power-source lines 132 between the resistor element 142 and the connection node $N_1$, and the control-signal wiring 136 intersects the power-source lines 132 between the connection node $N_1$ and the signal-line driver circuit 122. As shown in FIG. 4 and FIG. 6, the electrical connection between the plurality of protection circuits 140 and the control-signal wiring 136 is performed via a connection wiring 136*a* structuring a part of the control-signal wiring 136, and the connection wiring 136*a* exists in the same layer as the gate electrode 152 and intersects the power-source lines 132. The electrical connection between the control-signal wiring 136 including the connection wiring 136*a* and the plurality of protection circuits 140 is performed through openings provided in the gate insulating film 154 and the interlayer insulating film 158 and arranged between the plurality of protection circuits 140 and the power-source lines 132. Therefore, there is only one connection wiring 136*a*, which is not connected to but intersect the two power-source lines 132, between the plurality of protection circuits 140 and the signal-line driver circuit 122. This configuration can suppress the increase in parasitic capacitance caused by the power-source lines 132.

Figure 7:
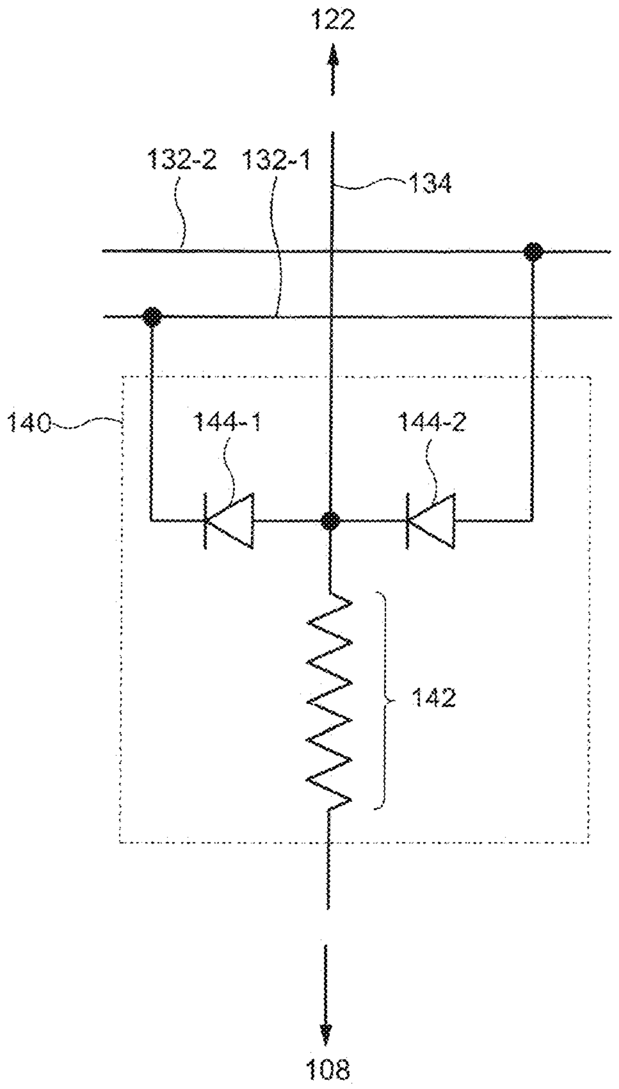
FIG. 7 is an equivalent circuit diagram showing an example of protection circuits.

As described above, the plurality of protection circuits 140 is provided between the terminals 108 to which the clock signals are input and the corresponding control-signal wirings 136. However, signals other than the clock signals need not necessarily be input to the terminals 108 to which the plurality of protection circuits 140 is connected. For example, one protection circuit 140 may be arranged between the terminal 108 and the signal wiring 134 as shown in FIG. 7. That is, the total number of protection circuits 140 connected to one terminal 108 and its corresponding signal wiring 134 may be 1. The configuration of the protection circuit 140 connected to the signal wiring 134 and the configuration of the protection circuit 140 connected to the control-signal wiring 136 are identical. Therefore, the resistance of the former resistor element 142 and the resistance of the latter resistor element 142 are also identical.

Conventionally, a method has been employed in which the resistance of the resistor element provided in the protection circuit is increased as a method for improving the withstand voltage of the signal-line driver circuit 122 against surge currents and static electricity. However, an increase in the resistance of the resistor element leads to an increase in the time constant of the signal supplied through this protection circuit. In particular, an increase in the time constant of clock signals having a high frequency narrows the drive margin of the signal-line driver circuit and is a major cause of inducing abnormal operation. The increase in the time constant caused by the increased resistance of the resistor elements can be suppressed by increasing the number of wirings supplying the signals. However, as the numbers of signal wirings 134 and the power-source lines 132 increase with the increase in resolution of the display device, the parasitic capacitance between the control-signal wiring 136 supplying the clock signals and the signal wiring 134 and between the control-signal wiring 136 and the power-source lines 132 increases in the frame region. Since such an increase in parasitic capacitance conversely causes an increase in the time constant, an increase in the number of wirings is not necessarily considered to be an effective means of reducing the time constant. In addition, an increase in the number of control-signal wirings 136 causes an increase in the number of terminals 108 and an increase in size of the connector 184.

On the other hand, the plurality of protection circuits 140 connected in parallel are provided to the control-signal wirings 136 electrically connecting the terminals 108 input with the clock signals and the signal-line driver circuit 122 in the display device 100. Therefore, if the number of protection circuits connected to the terminals 108 input with the clock signals is n (n is an integer equal to or greater than 2), the composite resistance of the resistor elements 142 of the plurality of protection circuits 140 is 1/n of that of the single protection circuit 140. Since the resistance of the resistor element is one of the parameters determining the time constant, the time constant can be reduced by reducing the composite resistance. Therefore, it is possible to reduce the time constant of the clock signals and increase the drive margin of the signal-line driver circuit without increasing the number of terminals or increasing the size of the connector 184 by implementing the embodiment of the present invention. In addition, the tolerance to currents caused by static electricity and surge currents can also be greatly improved by providing the plurality of protection circuits 140 to the terminals 108 input with the clock signals as described above.

Furthermore, since the electrical connection between the protection circuit 140 and the control-signal wiring 136 is performed between the protection circuit 140 and the power-source lines 132 as described above, the increase in parasitic capacitance caused by intersection with the power-source lines 132 is suppressed. It can be said that such a structure also contributes to the reduction of the time constant of the clock signals. Therefore, the drive margin of the signal-line driver circuit can be ensured even in ultra-high definition display devices by applying the embodiment of the present invention.

3. LAYOUT OF PROTECTION CIRCUIT

Figure 8:
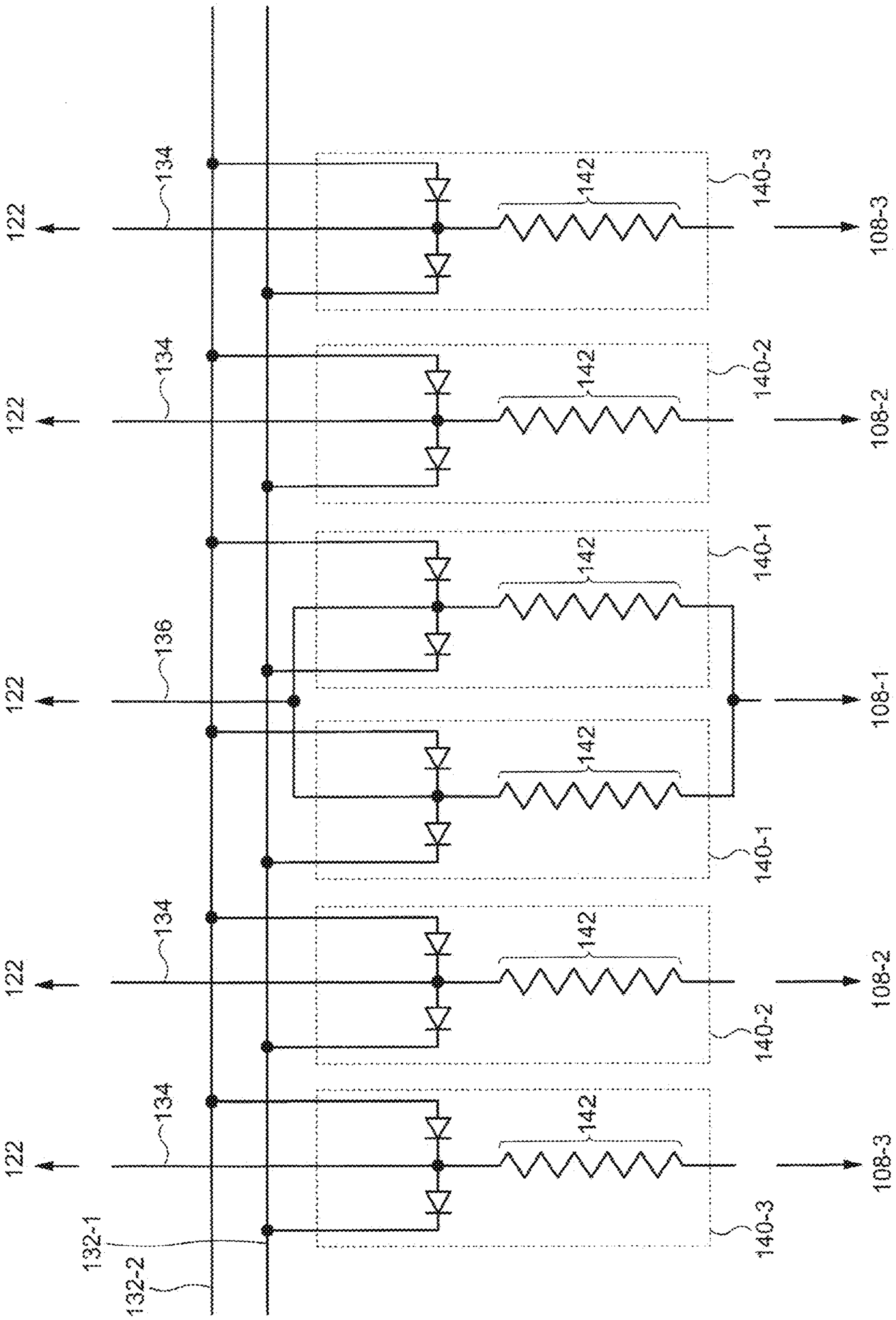
FIG. 8 is an equivalent circuit diagram including a protection circuit according to an embodiment of the present invention.

As described above, the plurality of protection circuits 140 is connected to the terminals 108 to which the clock signals are input in the display device 100. Therefore, the area of the protection circuits for the terminals 108 to which the clock signals are input is larger than the area of the protection circuits 140 for the terminal 108 to which other signals are input. However, the following layout allows the protection circuits 140 to be arranged without increasing the area for arranging all of the terminals 108. Hereinafter, this layout is explained using a region in which the first terminals 108-1 input with the clock signals as well as the second terminals 108-2 and the third terminals 108-3 input with signals other than the clock signals are arranged as shown in the equivalent circuit of FIG. 8. In FIG. 8, the second terminals 108-2 and the third terminals 108-3 are arranged in sequence on both sides of one first terminal 108-1. The second terminal 108-2 is sandwiched between the first terminal 108-1 and the third terminal 108-3. A plurality (here two) of first protection circuits 140-1 is connected to the first terminal 108-1, while the second terminal 108-2 and the third terminal 108-3 are respectively connected to a single second protection circuit 140-2 and a single third protection circuit 140-3.

Figure 9:
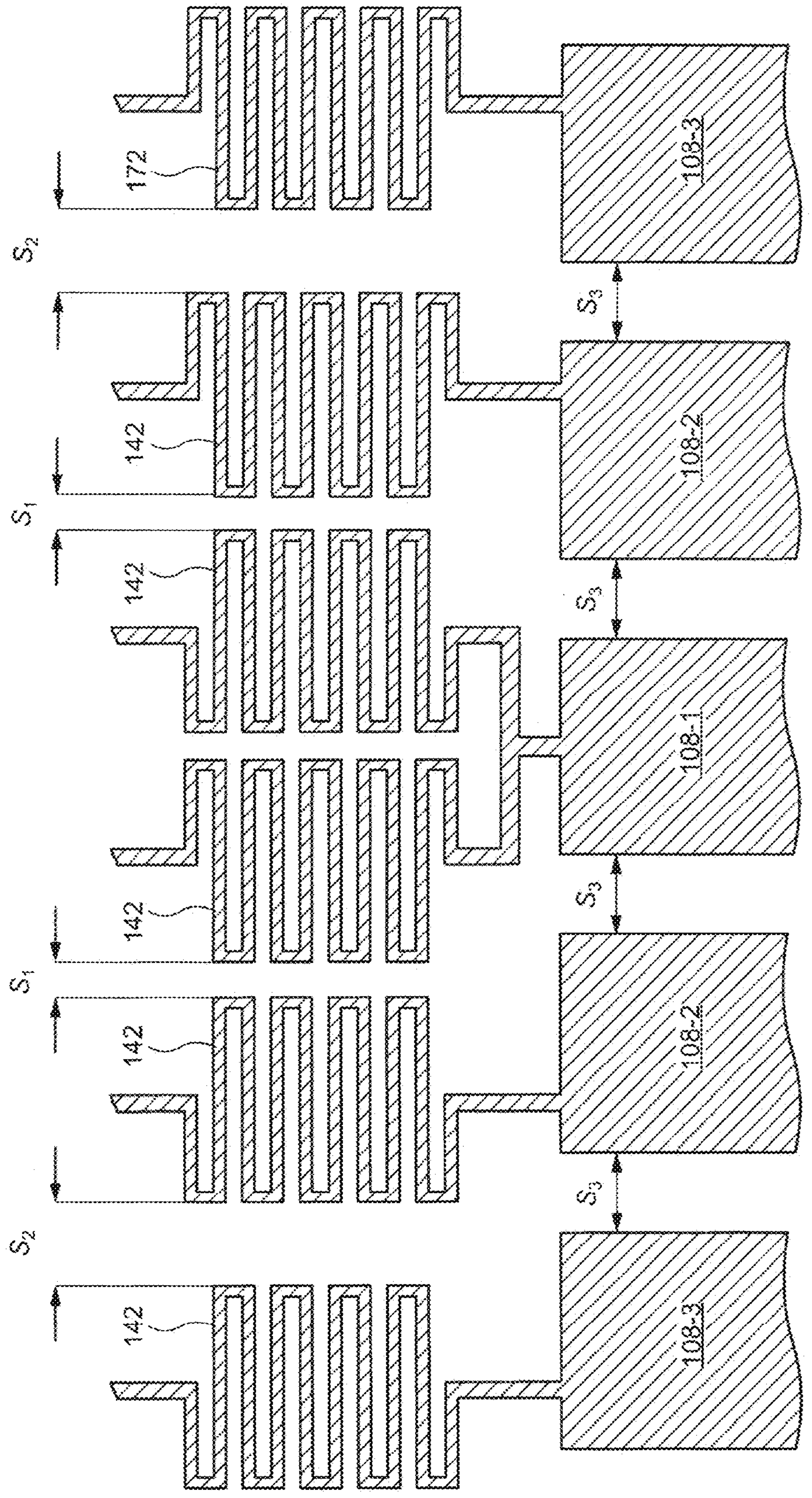
FIG. 9 is a schematic top view of a display device according to an embodiment of the present invention.

A schematic top view corresponding to the equivalent circuit of FIG. 8 is shown in FIG. 9. Here, a portion of the terminals 108 and the resistor elements 142 are illustrated. As shown in FIG. 9, the plurality of terminals 108 is arranged so that the spacing $S_3$ between adjacent terminals 108 is constant. That is, the pitch of the plurality of terminals 108 is identical. The spacing $S_3$ may be set appropriately within a range equal to or greater than 40 μm and equal to or less than 1.0 mm, for example.

In contrast, the protection circuits 140 are provided so that the spacing between adjacent resistor elements 142 varies in the arrangement direction of the terminals 108 (row direction or column direction). Specifically, the protection circuits 140 are arranged such that the spacing $S_1$ between the resistor element 142 of the first protection circuit 140-1 closest to the second protection circuit 140-2 and the resistor element 142 of the second protection circuit 140-2 is smaller than the spacing $S_2$ between the resistor elements 142 of the second protection circuit 140-2 and the third protection circuit 140-3. Thus, the resistor element 142 of the second protection circuit 140-2 is shifted to the opposite side of the first protection circuit 140-1 relative to the corresponding second terminal 108-2. In the example shown in FIG. 9, the resistor element 142 of the third protection circuit 140-3 is also shifted opposite to the first protection circuit 140-1 relative to the corresponding third terminal 108-3. Although not illustrated, when a fourth protection circuit is arranged on the opposite side of the second protection circuit 140-2 relative to the third protection circuit 140-3, the spacing between the resistor elements 142 of the third protection circuit 140-3 and the fourth protection circuit may be the same as or greater than the spacing $S_2$. The spacing between the resistor elements 142 of adjacent protection circuits 140 may increase in a stepwise or continuous manner over the entire terminals 108 as one moves away from the first protection circuit 140-1 in the arrangement direction of the terminals 108, or the spacing between the resistor elements 142 may be constant in the protection circuits 140 which are spaced away from the first protection circuit 140-1 by a certain distance. This layout enables the protection circuits 140 to be arranged without increasing the spacing $S_3$ between the terminals 108 even when the length of the region occupied by the plurality of first protection circuits 140-1 connected to the terminal 108-1 (length in the arrangement direction of the terminals 108) is greater than the width of each terminal 108.

Figure 10:
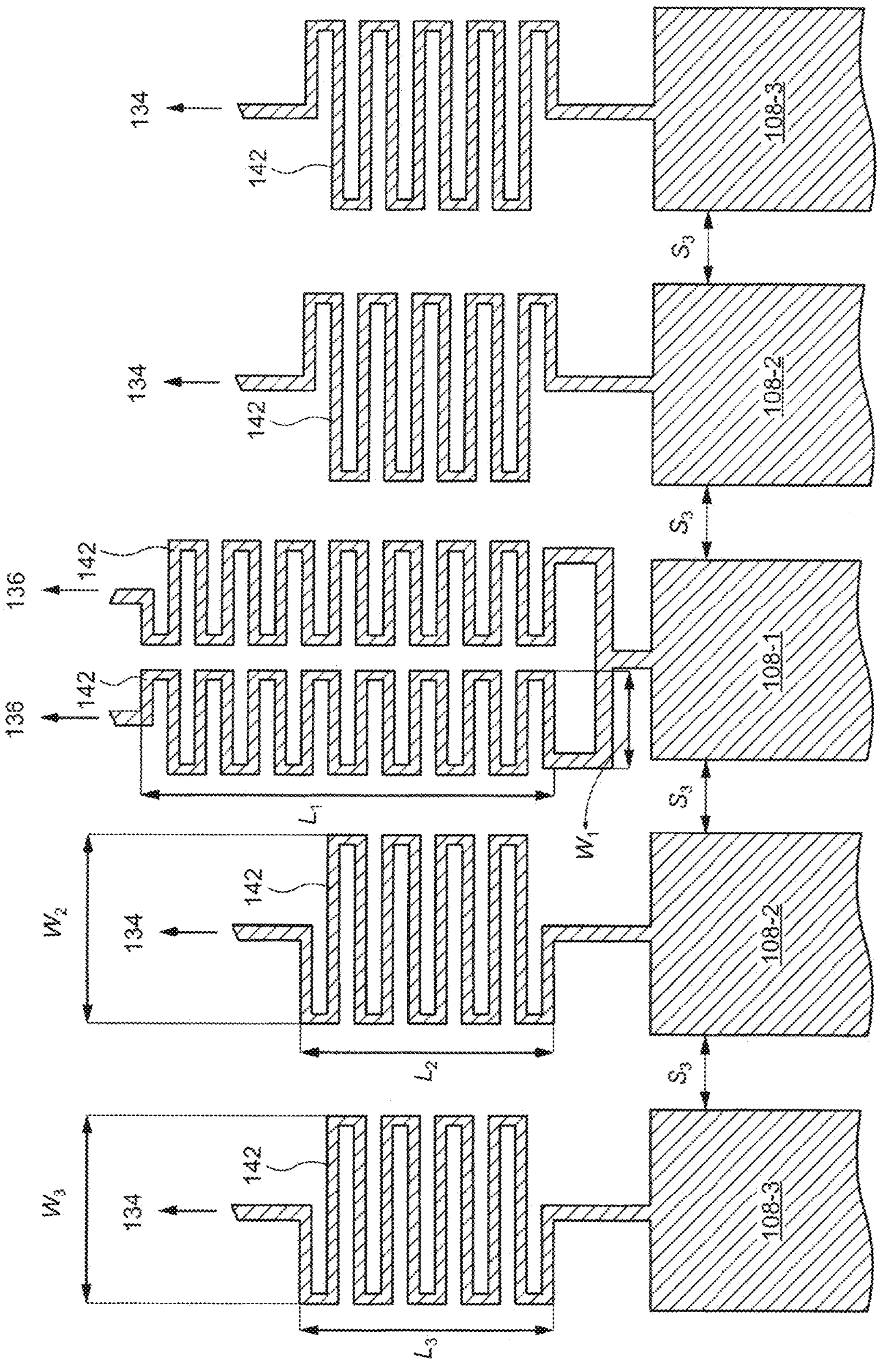
FIG. 10 is a schematic top view of a display device according to an embodiment of the present invention.

Alternatively, the length of the resistor element 142 (length in the direction perpendicular to the arrangement direction of the terminals 108) may be varied as shown in FIG. 10. That is, the protection circuits 140 may be arranged so that the length L1 of the resistor element 142 of the first protection circuit 140-1 in the column direction is longer than the lengths L2 and L3 of the resistor elements 142 of the second protection circuit 140-2 and the third protection circuit 140-3 in the column direction. Employment of this layout allows the protection circuits 140 to be arranged without shifting the resistor element 142 with respect to the terminal 108 and increasing the spacing $S_3$ between the terminals 108 because the width of the region occupied by each protection circuit 140 (length in the arrangement direction of the 108 terminals) can be equal to or less than the pitch of the terminals 108. Note that since the resistance of the resistor element 142 is set to be the same among the protection circuits 140, the width $W_1$ of resistor element 142 of the first protection circuit 140-1 is smaller than the widths $W_2$ and $W_3$ of the resistor elements 142 of the second protection circuit 140-2 and the third protection circuit 140-3.

Figure 11:
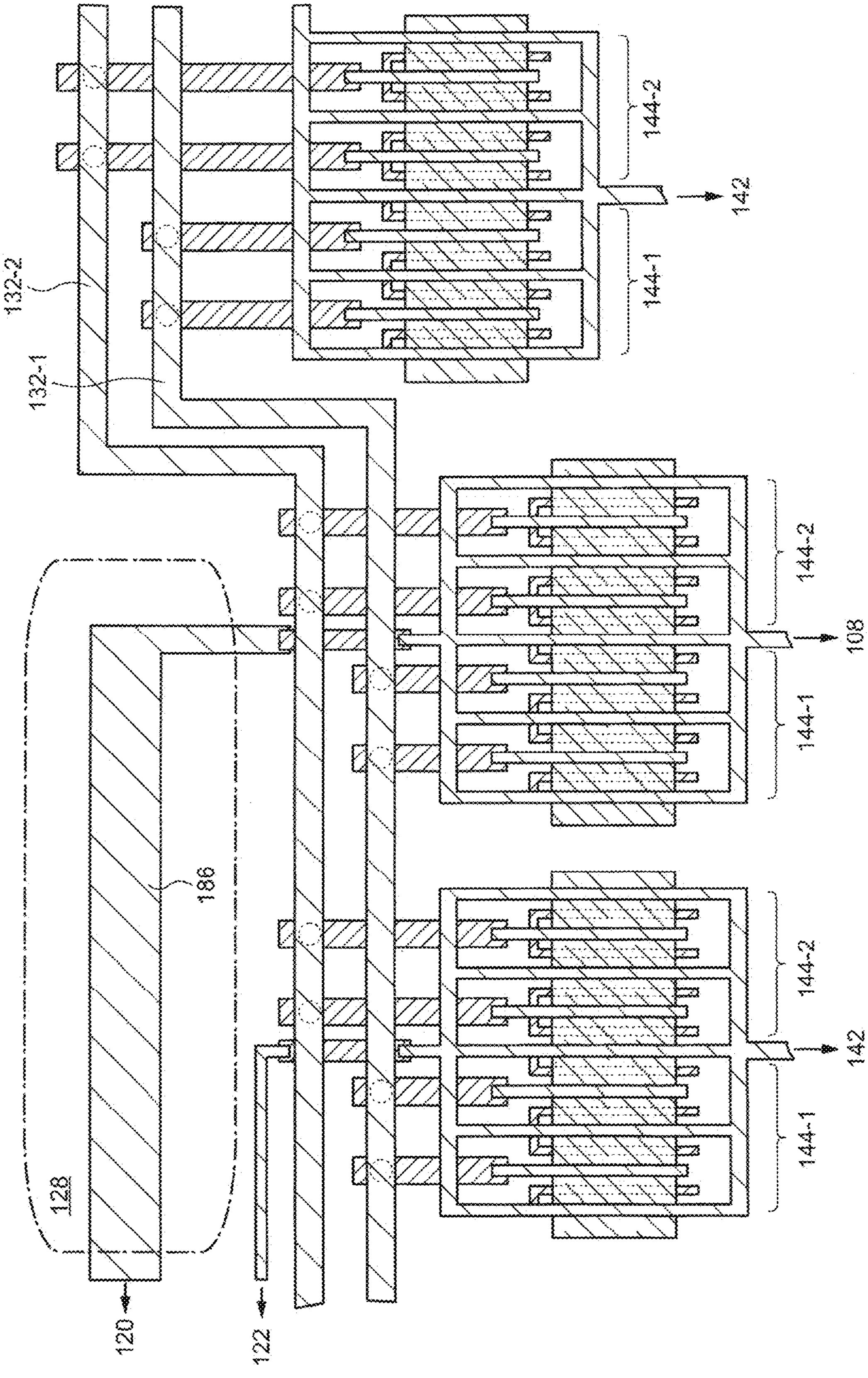
FIG. 11 is a schematic top view of a display device according to an embodiment of the present invention.

The layout shown in FIG. 10 allows the formation of a space 128 between the protection circuits 140 other than the first protection circuit 149-1 and the signal-line driver circuit 122 (FIG. 11). Therefore, a variety of components (wirings, pads, and the like) can be provided in this space 128. For example, the power-source lines 132 are bent so that the distance between the power-source lines 132 and the signal-line driver circuit 122 (first distance) in a region sandwiched by the protection circuit 140 connected to the terminal 108 input with the clock signals and the signal-line driver circuit 122 is shorter than that (second distance) in a region sandwiched by the protection circuits 140 connected to the terminals input with signals other than the clock signals and the signal-line driver circuit 122 as shown in FIG. 11, thereby creating the space 128 between the power-source lines 132 and the signal-line driver circuit 122. Hence, a wiring 186 for supplying power to the gate-line driver circuit 120 can be placed in the space 128. Therefore, the width of the wiring 186 can be increased, and the influence of the resistance of the wiring 186 can be reduced. Although not illustrated, the space 128 can also be formed between the power-source lines 132 and the protection circuits 140 when the power-source lines 132 are not bent in this manner.

4. MODIFIED EXAMPLES

The structure of the protection circuit 140 and the display device 100 including the protection circuit 140 is not limited to the structures described above. Hereinafter, modified examples of the protection circuit 140 and the display device 100 are described.

4-1. Modified Example 1

Figure 12:
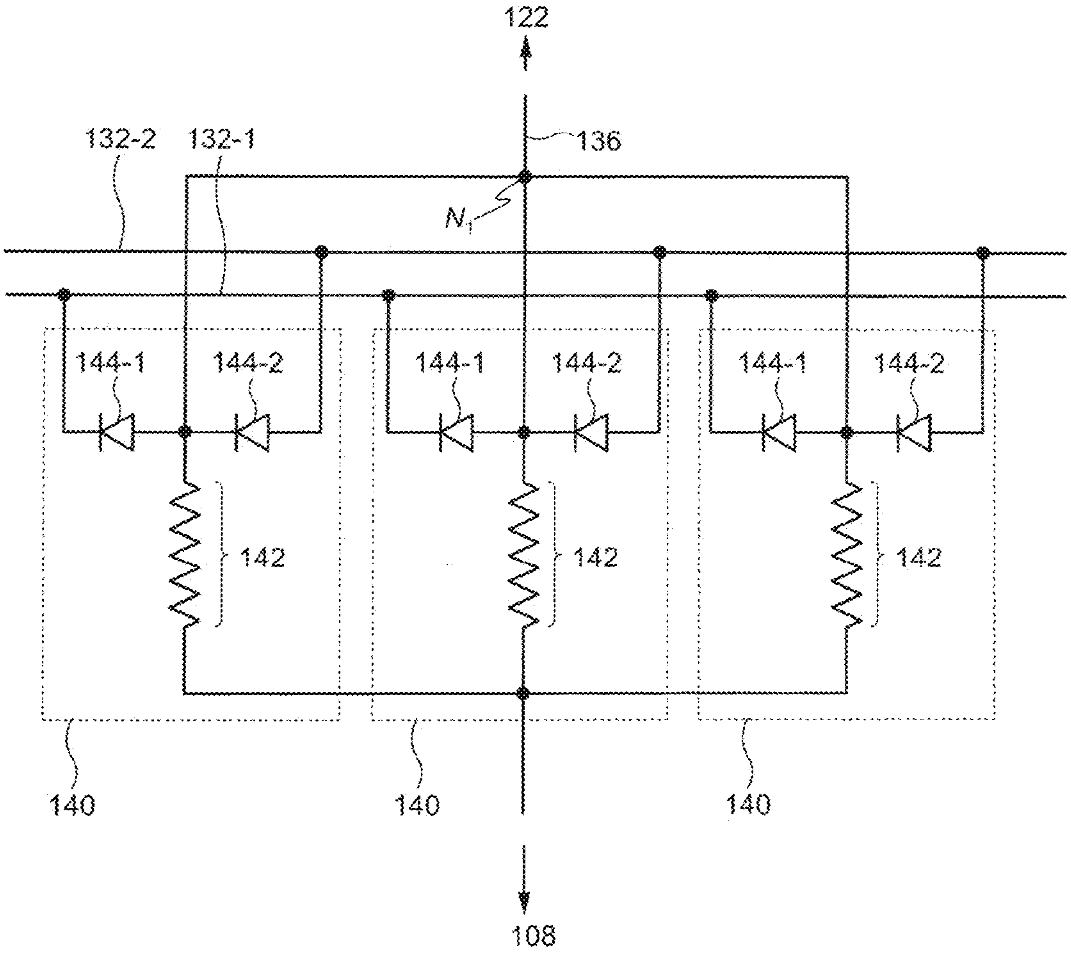
FIG. 12 is an equivalent circuit diagram including a protection circuit according to an embodiment of the present invention.

There is no restriction on the number of protection circuits 140 connected to the terminals 108 input with the clock signals, and three or more protection circuits 140 may be connected to these terminals 108 as shown in the equivalent circuit in FIG. 12. In this case, it is also possible to recognize the plurality of protection circuits 140 connected to one terminal 108 and its corresponding control-signal wiring 136 as a single protection circuit. In this case, each protection circuit is considered to include, in addition to the first resistor element, the second resistor element, and the first diode to the fourth diode, a third resistor element (resistor element 142 of the rightmost protection circuit 140 in FIG. 11), a fifth diode (first diode 144-1 of the said protection circuit 140), and a sixth diode (the second diode 144-2 of the said protection circuit 140). A first end and a second end of the third resistor element are electrically connected to the terminal 108 and the second end of the first resistor element, respectively. The second end of the third resistor element is further electrically connected to an input terminal of the fifth diode and an output terminal of the sixth diode. An output terminal of the fifth diode and an input terminal of the sixth diode are electrically connected to the output terminal of the first diode and the input terminal of the second diode, respectively. Although not illustrated, an auxiliary resistor element (see below) may also be connected between the third resistor element and the connection node $N_1$. The electrostatic breakdown voltage of the display device 100 can be improved more effectively by providing three or more protection circuits 140.

4-2. Modified Example 2

For the purpose of further improving the electrostatic breakdown voltage, a resistor element may be further provided in each protection circuit 140. Specifically, an auxiliary resistor element 148 may be provided between the resistor element 142 and the connection node $N_1$ in each protection circuit 140 as shown in the equivalent circuit of FIG. 13. A first end and a second end of the auxiliary resistor element 148 are electrically connected to the second end of the resistor element 142 and the control-signal wiring 136, respectively. The second ends of the auxiliary resistor elements 148 of the plurality of protection circuits 140 are electrically connected to each other. In other words, the resistor element 142 is electrically connected to the control-signal wiring 136 via the auxiliary resistor element 148.

Figure 13:
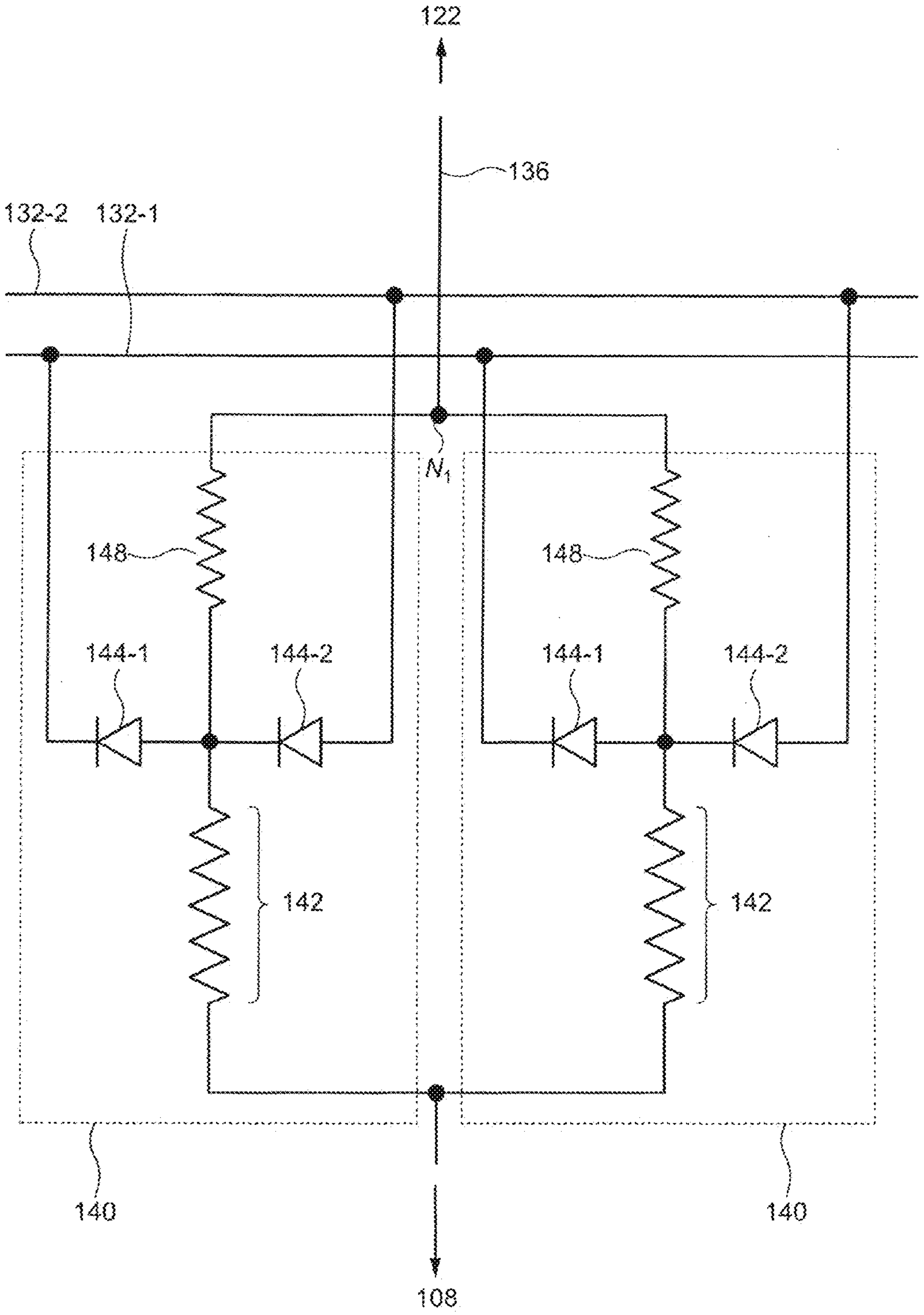
FIG. 13 is an equivalent circuit diagram including a protection circuit according to an embodiment of the present invention.
Figure 14:
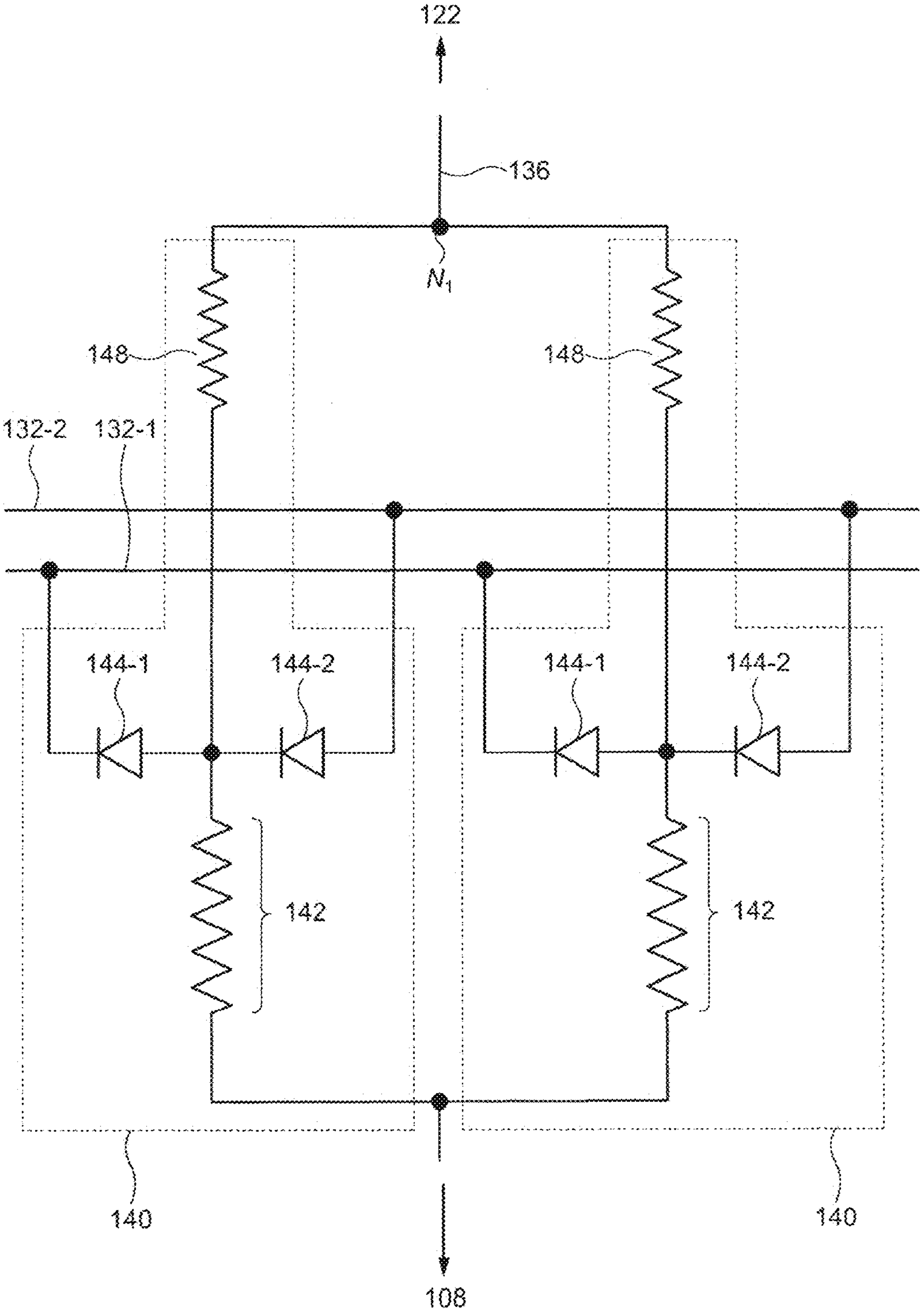
FIG. 14 is an equivalent circuit diagram including a protection circuit according to an embodiment of the present invention.

Similar to the examples demonstrated in FIG. 3 and the like, the connection node $N_1$ between the protection circuit 140 and the control-signal wiring 136 may be performed between the power-source lines 132 and the protection circuit 140 (FIG. 13). In detail, the connection node $N_1$ may be located between the power-source lines 132 and the auxiliary resistor element 148. This structure can prevent the increase in parasitic capacitance caused by the power-source lines 132. However, in consideration of the layout, the power-source lines 132 may be arranged to intersect the protection circuit 140, and the connection node $N_1$ between the protection circuit 140 and the control-signal wiring 136 may be placed between the signal-line driver circuit 122 and the power-source lines 132 as shown in FIG. 14 and FIG. 15, depending on the size of the auxiliary resistor element 148.

Figure 15:
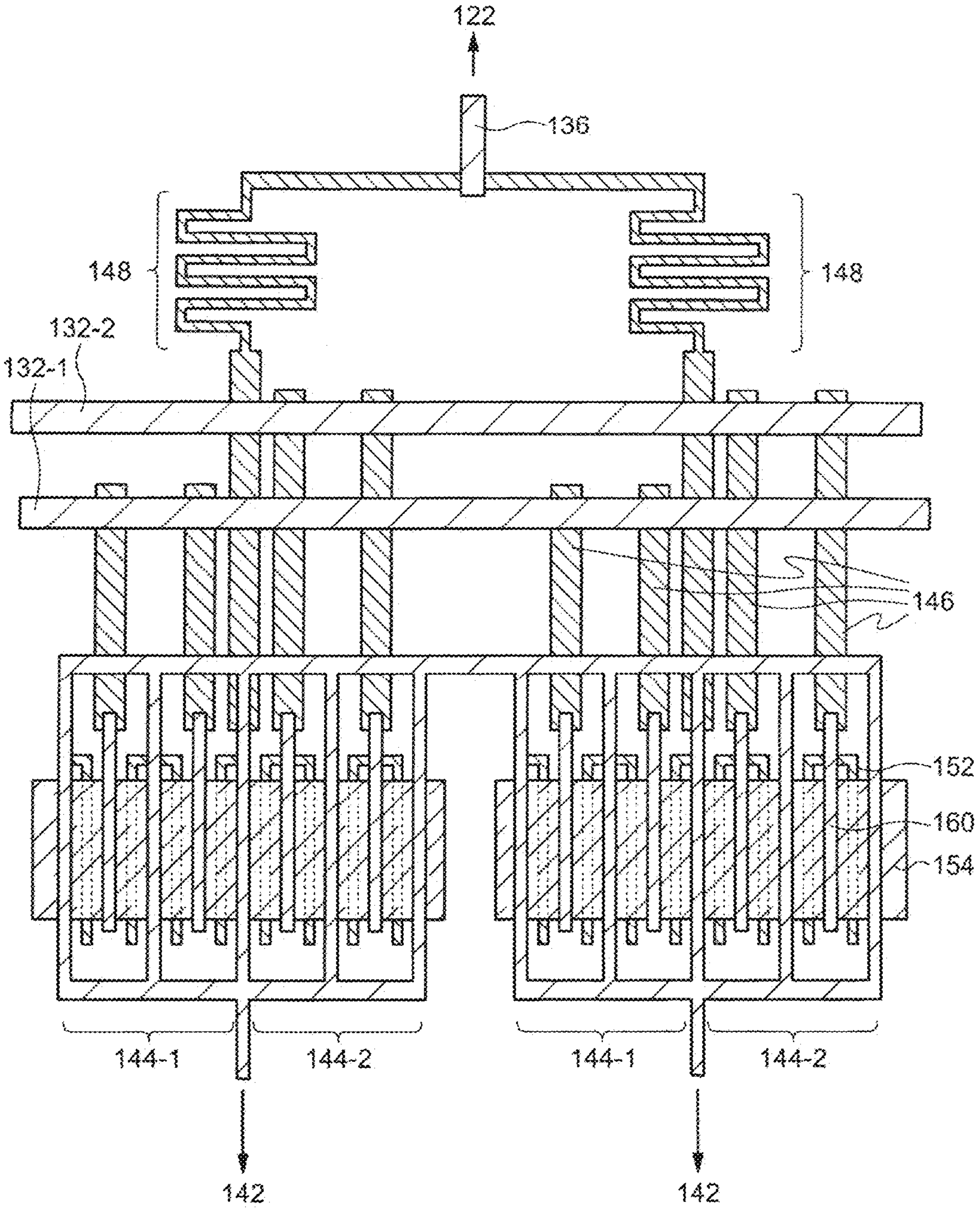
FIG. 15 is a schematic top view of a display device according to an embodiment of the present invention.

As shown in FIG. 15, the auxiliary resistor element 148 is preferably formed using a metal film existing in the same layer as the gate electrode 152 structuring the transistor 150. The auxiliary resistor element 148 is formed to have a smaller width compared to other wirings (e.g., the control-signal wiring 136 and the connection wiring 146). In order to obtain resistance, the auxiliary resistor element 148 is provided with a bent or curved structure so as to have a longer current path. The resistance of the auxiliary resistor element 148 may be the same as or different from that of the resistor element 142 and may be set to be equal to or greater than 0.5 kΩ and equal to or less than 5.0 kΩ, preferably equal to or greater than 0.1 kΩ and equal to or less than 1.0 kΩ. It is possible to prevent electrostatic breakdown of the driver circuit caused by static electricity and surge currents by providing the auxiliary resistor element 148.

4-3. Modified Example 3

Figure 16:
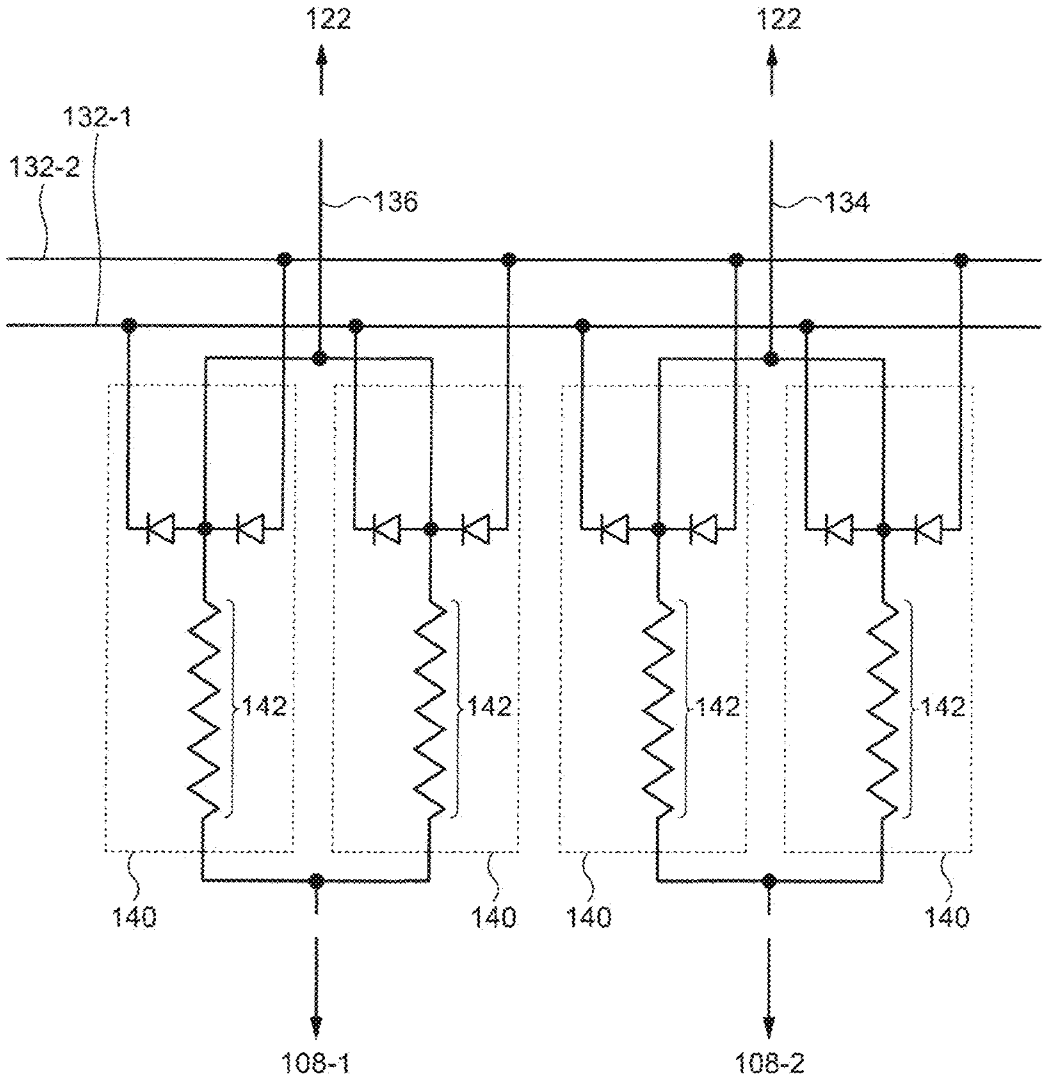
FIG. 16 is an equivalent circuit diagram including a protection circuit according to an embodiment of the present invention.

In the above examples, the plurality of protection circuits 140 connected in parallel to each other is connected to the terminals 108 input with the clock signals, which are high frequency signals, and the control-signal wiring 136, and the total number of the protection circuits 140 connected to the terminals 108 input with image signals, reset signals, initialization signals, or the like with a lower frequency than the clock signal is 1. However, the configuration of the display device 100 is not limited thereto, and a plurality of protection circuits 140 connected in parallel to each other may also be connected to the terminals 108 input with signals with lower frequency than the clock signals. For example, as shown in the equivalent circuit of FIG. 16, a plurality of protection circuits 140 connected in parallel to each other may be connected to each of the first terminal 108-1 input with the clock signals and the second terminal 108-2 input with the image signals, the reset signals, or the initialization signals and adjacent to the first terminal 108-1. The plurality of protection circuits 140 is each connected to the signal wiring 134, whereby the image signals, the reset signals, or the initialization signals are input to the signal-line driver circuit 122. Although not illustrated, a plurality of protection circuits 140 connected in parallel to each other may be provided for the terminals 108 for inputting signals to be input to the gate-line driver circuit 120 (e.g., enable signals) or for inputting signals to be input to a touch panel provided over the display device 100 (sensor signals). Alternatively, a plurality of protection circuits 140 connected in parallel to each other may be provided for the terminal 108 for supplying power to the gate-line driver circuit 120.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed:

1. A display device comprising:
- a plurality of pixels;
- a driver circuit configured to control the plurality of pixels;
- a plurality of first protection circuits connected in parallel to each other;
- a first terminal electrically connected to the driver circuit through at least one of the plurality of first protection circuits;
- a first power-source line configured to be supplied with a first potential;
- a second power-source line configured to be supplied with a second potential lower than the first potential;
- a first control-signal wiring electrically connecting at least one of the plurality of first protection circuits to the driver circuit;
- a second protection circuit;
- a second terminal electrically connected to the driver circuit through the second protection circuit; and
- a first signal wiring electrically connecting the second protection circuit to the driver circuit, wherein each of the plurality of first protection circuits comprises:
- a resistor element with a first end and a second end electrically connected to the first terminal and the first control-signal wiring, respectively;
- a first diode with a first input terminal and a first output terminal electrically connected to the second end of the resistor element and the first power-source line, respectively; and
- a second diode with a second input terminal and a second output terminal electrically connected to the second power-source line and the second end of the resistor element, respectively, the second protection circuit has a same structure as one of the first protection circuits, and the first terminal and the second terminal are configured to be respectively input with a first signal and a second signal having a lower frequency than the first signal.

2. The display device according to claim 1, wherein a node to which the first control-signal wiring and the plurality of protection circuits are connected is located on a side of the plurality of protection circuits with respect to the first power-source line and the second power-source line.

3. The display device according to claim 1, wherein the first terminal is configured to be input with a clock signal.

4. The display device according to claim 1, further comprising second protection circuits including the second protection circuit, and first signal wirings including the first signal wiring, wherein a total number of the second protection circuits connected to one of the first signal wirings is 1.

5. The display device according to claim 1, wherein a total number of the first protection circuits is 2 or 3.

6. The display device according to claim 1, wherein the first protection circuits each further comprise an auxiliary resistor element, a first end of the auxiliary resistor element is electrically connected to the second end of the resistor element, and a second end of the auxiliary resistor element is electrically connected to the first control-signal wiring.

7. The display device according to claim 6, wherein a node to which the first control-signal wiring and the plurality of protection circuits is connected is located on a side of the driver circuit with respect to the first power-source line and the second power-source line.

8. The display device according to claim 1, further comprising:

a third protection circuit;

a third terminal electrically connected to the driver circuit through the third protection circuit; and a second signal wiring electrically connecting the third protection circuit to the driver circuit, wherein the third protection circuit has a same structure as one of the first protection circuits, the third terminal is configured to be input with a third signal having a lower frequency than the first signal, the second terminal is adjacent to and is sandwiched by the first terminal and the third terminal, and the first terminal, the second terminal, and the third terminal are arranged at a same pitch.

9. The display device according to claim 8, further comprising third protection circuits including the third protection circuit, and second signal wirings including the second signal wiring, wherein a total number of the third protection circuits connected to one of the second signal wirings is 1.

10. The display device according to claim 8, a first distance between the resistor element of the second protection circuit and the resistor element of the one of the first protection circuits closest to the second protection circuit is smaller than a second distance between the resistor element of the second protection circuit and the resistor element of the third protection circuit.

11. The display device according to claim 8, wherein the plurality of pixels is arranged in a matrix form having a plurality of rows and a plurality of columns, and a length of the resistor element of the one of the first protection circuits in a column direction is longer than those of the second protection circuit and the third protection circuit.

12. The display device according to claim 8, wherein the plurality of pixels is arranged in a matrix form having a plurality of rows and a plurality of columns, and a length of the resistor element of the one of the first protection circuits in a row direction is shorter than those of the second protection circuit and the third protection circuit.

13. The display device according to claim 8, wherein a distance from the first power-source line to the driver circuit in a region between the one of the first protection circuits and the driver circuit is shorter than a distance between the first power-source line to the driver circuit in a region between the second protection circuit and the driver circuit.

* * * * *